(12) United States Patent
Hyun

(10) Patent No.: US 12,510,928 B2
(45) Date of Patent: Dec. 30, 2025

(54) FOLDABLE DISPLAY APPARATUS

(71) Applicant: LG DISPLAY CO., LTD., Seoul (KR)

(72) Inventor: Kwangmin Hyun, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 231 days.

(21) Appl. No.: 17/859,740

(22) Filed: Jul. 7, 2022

(65) Prior Publication Data

US 2023/0012489 A1 Jan. 19, 2023

(30) Foreign Application Priority Data

Jul. 16, 2021 (KR) .................. 10-2021-0093274

(51) Int. Cl.
*G06F 1/16* (2006.01)
(52) U.S. Cl.
CPC .................. *G06F 1/1641* (2013.01)
(58) Field of Classification Search
CPC .......... G06F 1/16; G06F 1/1652; G09F 9/301; H04M 1/0268
See application file for complete search history.

(56) References Cited

U.S. PATENT DOCUMENTS

| | | | | |
|---|---|---|---|---|
| 8,264,822 B2* | 9/2012 | Sakamoto | ............... | F16M 11/22 248/419 |
| 8,670,085 B2* | 3/2014 | Jean | .................. | G02F 1/133308 349/61 |
| 9,823,509 B2* | 11/2017 | Chae | ................. | G02F 1/133606 |
| 10,274,769 B2* | 4/2019 | Kil | ....................... | G02B 6/0055 |
| 10,368,452 B2* | 7/2019 | Yun | ......................... | G09F 9/301 |
| 10,485,116 B2* | 11/2019 | Kim | ....................... | G06F 1/1641 |
| 10,631,378 B2* | 4/2020 | Lee | ........................ | G06F 1/1637 |
| 10,680,210 B2* | 6/2020 | Lee | .................... | H10K 59/8794 |
| 10,921,856 B2* | 2/2021 | Han | ...................... | G06F 1/1652 |
| 10,950,824 B2* | 3/2021 | Kim | ........................ | H10K 50/87 |
| 11,430,963 B2 | 8/2022 | Park et al. | | |
| 11,806,975 B2* | 11/2023 | Seki | .......................... | B32B 3/02 |
| 11,844,265 B2 | 12/2023 | Park et al. | | |
| 12,045,089 B2* | 7/2024 | Moon | .................. | G06F 1/1618 |
| 12,302,742 B2 | 5/2025 | Park et al. | | |
| 2015/0346782 A1* | 12/2015 | Bushnell | ............... | H05K 13/00 361/679.02 |

(Continued)

FOREIGN PATENT DOCUMENTS

| | | |
|---|---|---|
| CN | 210324970 U | 4/2020 |
| CN | 111583788 A | 8/2020 |

(Continued)

OTHER PUBLICATIONS

Office Action issued on Jun. 9, 2025 in Chinese Patent Application No. 202210831964.5.

*Primary Examiner* — Rockshana D Chowdhury
*Assistant Examiner* — Douglas R Burtner
(74) *Attorney, Agent, or Firm* — Morgan, Lewis & Bockius LLP

(57) ABSTRACT

A foldable display apparatus includes a display panel assembly, and a plate assembly disposed beneath the display panel assembly and including an upper plate and a lower plate. The lower plate extends in a direction of the display panel assembly to cover at least a portion of each side face of the display panel assembly. The upper plate is disposed between the display panel assembly and the lower plate and is connected to the lower plate.

22 Claims, 12 Drawing Sheets

(56) References Cited

U.S. PATENT DOCUMENTS

| | | | |
|---|---|---|---|
| 2018/0102496 A1* | 4/2018 | Kim | H10K 50/87 |
| 2019/0037164 A1* | 1/2019 | Kim | H04R 17/005 |
| 2019/0196250 A1* | 6/2019 | Kim | G02B 6/0051 |
| 2019/0208300 A1* | 7/2019 | Lee | H04R 1/028 |
| 2020/0183074 A1* | 6/2020 | Oh | G02F 1/133615 |
| 2020/0184857 A1* | 6/2020 | Lee | G09F 9/301 |
| 2020/0201384 A1* | 6/2020 | Kim | G02B 6/0078 |
| 2021/0068276 A1* | 3/2021 | Kim | G06F 1/1652 |
| 2022/0210933 A1* | 6/2022 | Park | G06F 1/1637 |
| 2022/0399511 A1* | 12/2022 | Bok | B32B 15/046 |

FOREIGN PATENT DOCUMENTS

| | | |
|---|---|---|
| KR | 10-2019-0070740 A | 6/2019 |
| KR | 10-2020-0062827 A | 6/2020 |
| KR | 10-2020-0070904 A | 6/2020 |

* cited by examiner

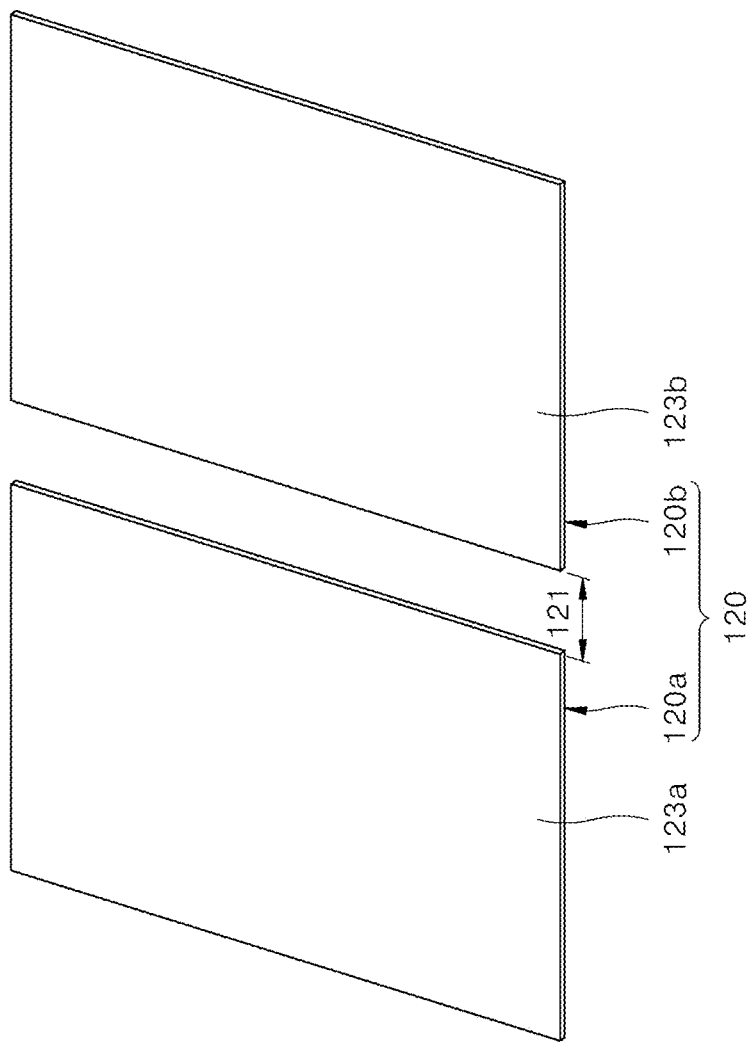

FOLDABLE DISPLAY APPARATUS

CROSS-REFERENCE TO RELATED APPLICATION

This application claims priority to and benefit of Korean Patent Application No. 10-2021-0093274 filed on Jul. 16, 2021, which is hereby incorporated by reference as when fully set forth herein.

BACKGROUND

Technical Field

The present disclosure relates to a foldable display apparatus.

Discussion of the Related Art

A display apparatus is implemented in a wide variety of types, such as a television, a monitor, a smart phone, a tablet PC, a laptop computer, and a wearable device.

Recently, various types of flexible display apparatuses, such as a foldable display apparatus, a rollable display apparatus, and a stretchable display apparatus, have been developed, so that portability is increasing.

The flexible display apparatus refers to a display apparatus to which a display panel having flexibility, such as a characteristic of being folded, rolled, bent, or curved, while maintaining display characteristics of an existing flat panel display apparatus is applied.

Among those, the foldable display apparatus has an advantage of occupying a small area by being folded during being carried and using a wide display screen by being unfolded when in use.

A user of the foldable display apparatus repeats an operation of folding and unfolding the foldable display apparatus an infinite number of times.

SUMMARY

When a display apparatus is driven, a lot of heat is generated from a display panel.

When the heat generated from the display panel is not effectively dissipated to the outside, the display panel, which is vulnerable to the heat, may be damaged, so that a defect rate of the display panel may increase.

In a foldable display apparatus, the display panel is used in an unfolded state, and then, is stored in a folded state when the use is finished.

When the foldable display apparatus is folded in a state in which the heat generated from the display panel is not properly dissipated, because an area exposed to the outside decreases, the heat dissipation may become difficult.

Moreover, when the foldable display apparatus is folded, one end and the other end of the display panel are comes into contact with each other, so that more heat may be generated from the display panel and the heat dissipation may further become difficult.

When the heat generated from the display panel is not effectively dissipated to the outside, reliability of the foldable display apparatus in a high-temperature environment is reduced.

Further, when charges generated on a surface of the foldable display apparatus flow into the display panel through a side face of the display panel, a longitudinal greenish problem in which a partial area of the side face of the display panel turns green over time may occur.

Accordingly, the inventors of the present disclosure have invented a foldable display apparatus that may improve the performance of dissipating the heat generated from the display panel and reduce the inflow of the charges to the display panel.

Accordingly, embodiments of the present disclosure are directed to a foldable display apparatus that substantially obviates one or more of the problems due to limitations and disadvantages of the related art.

An aspect of the present disclosure is to provide a foldable display apparatus that may improve the performance of dissipating the heat generated from the display panel.

Another aspect of the present disclosure is to provide a foldable display apparatus that may reduce the heat generated on the surface of the foldable display apparatus.

Another aspect of the present disclosure is to provide a foldable display apparatus that may reduce the inflow of the charges to the side face of the display panel.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a foldable display apparatus comprises a display panel assembly, and a plate assembly disposed beneath the display panel assembly and including an upper plate and a lower plate.

The lower plate extends in a direction of the display panel assembly to cover at least a portion of each side face of the display panel assembly, and the upper plate is disposed between the display panel assembly and the lower plate and is connected to the lower plate.

In another aspect, a foldable display apparatus comprises a display panel assembly including a foldable area and a non-foldable area, and a plate assembly disposed beneath the display panel assembly to accommodate at least a portion of the display panel assembly.

The plate assembly includes a lower plate extending in a direction of the display panel so as to be connected to at least a portion of each side face of the display panel assembly, and an upper plate connected to the extended lower plate.

In another aspect, a foldable display apparatus comprises a display panel assembly and a plate assembly disposed beneath the display panel assembly and including a lower plate and an upper plate disposed on the lower plate. The upper plate comprises a bottom face support portion which supports a lower portion of the display panel assembly, and a side face support portion which extends from side faces of the bottom face support portion toward the display panel assembly to cover at least a portion of each side face of the display panel assembly. The foldable display apparatus further includes a non-conductive portion disposed between the side face support portion of the upper plate and the side face of the display panel assembly.

According to an embodiment of the present disclosure, as the lower plate of the plate assembly extends in the direction of the display panel assembly to cover at least the portion of the side face of the display panel assembly, the heat directed in the direction of the side face of the display panel assembly may be dissipated to the outside through the lower plate, so that the heat dissipating performance of the display panel may be improved.

According to an embodiment of the present disclosure, because the upper plate of the plate assembly is placed between the display panel assembly and the lower plate and connected to the lower plate, the heat directed in the downward direction of the display panel assembly may be dissipated to the outside through the lower plate after passing through the upper plate, so that the heat dissipating performance of the display panel may be improved.

According to an embodiment of the present disclosure, because the upper plate of the plate assembly contains the metal foam having the high thermal conductivity while having the small thickness, the heat dissipating performance of the display panel may be improved while reducing the thickness of the foldable display apparatus.

According to an embodiment of the present disclosure, because most of the heat generated from the display panel is dissipated to the side face of the display panel and dissipated in the downward direction through the plate assembly, the transfer of the heat generated from the display panel to the surface of the foldable display apparatus, which is located above the display panel, may be reduced, so that the degradation of the convenience of the use of the user resulted from the generation of the heat on the surface of the foldable display apparatus may be reduced.

Because the lower plate of the plate assembly extends in the direction of the display panel assembly to cover at least the portion of the side face of the display panel assembly, the charges generated on the surface of the foldable display apparatus may be dissipated to the outside through the lower plate, so that the inflow of the charges to the side face of the display panel may be reduced.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain various principles. In the drawings:

FIG. 4A to FIG. 4C are perspective views and enlarged views of an upper plate of a plate assembly according to various embodiments of the present disclosure.

DETAILED DESCRIPTION

Figure 1A:
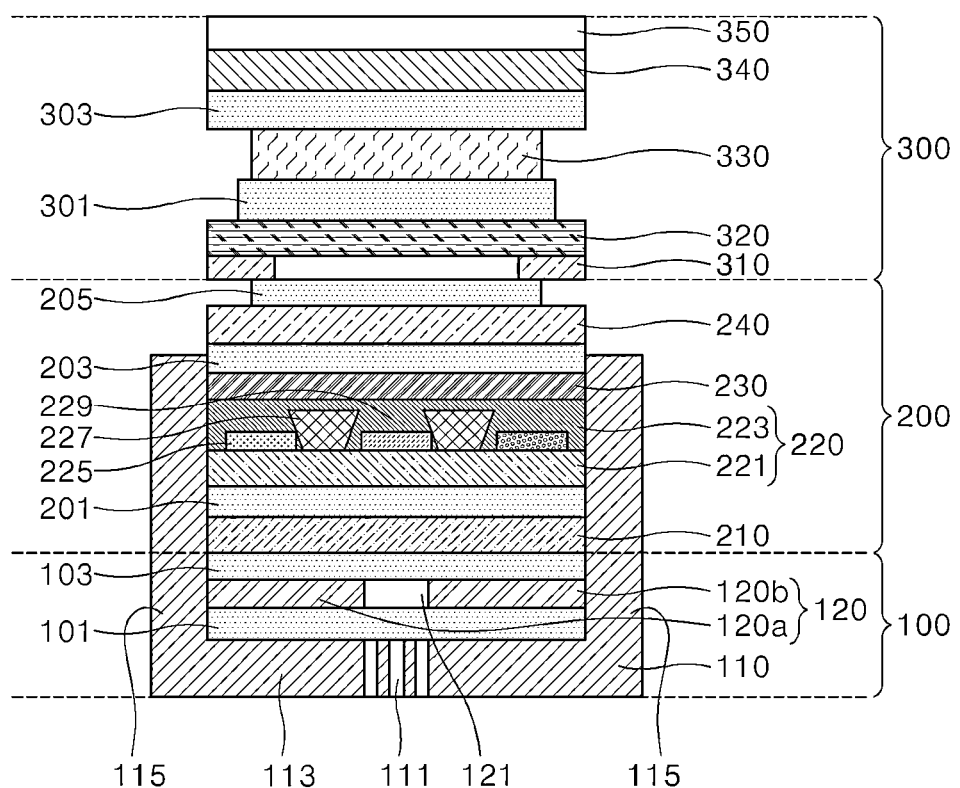
FIG. 1A and FIG. 1B are cross-sectional views of a foldable display apparatus according to an embodiment of the present disclosure.

Advantages and features of the present disclosure and a method of achieving the advantages and features will become apparent with reference to embodiments described later in detail together with the accompanying drawings. However, the present disclosure is not limited to the embodiments as disclosed below, but may be implemented in various different forms. Thus, these embodiments are set forth only to make the present disclosure complete, and to completely inform the scope of the disclosure to those of ordinary skill in the technical field to which the present disclosure belongs, and the present disclosure is only defined by the scope of the claims.

A shape, a size, a ratio, an angle, a number, etc. disclosed in the drawings for describing the embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event may occur therebetween unless "directly after", "directly subsequent" or "directly before" is not indicated.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

As used herein, the term "substantially," "about," and similar terms are used as terms of approximation, and are intended to account for inherent deviations in measured or calculated values that would be recognized by those of ordinary skill in the art. The term may be used to prevent unauthorized exploitation by an unauthorized infringer to design around accurate or absolute figures provided to help understand the present disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, various components of a foldable display apparatus that may improve a performance of dissipating heat generated from a display panel and reduce inflow of charges to the display panel will be described in detail.

Figure 1B:
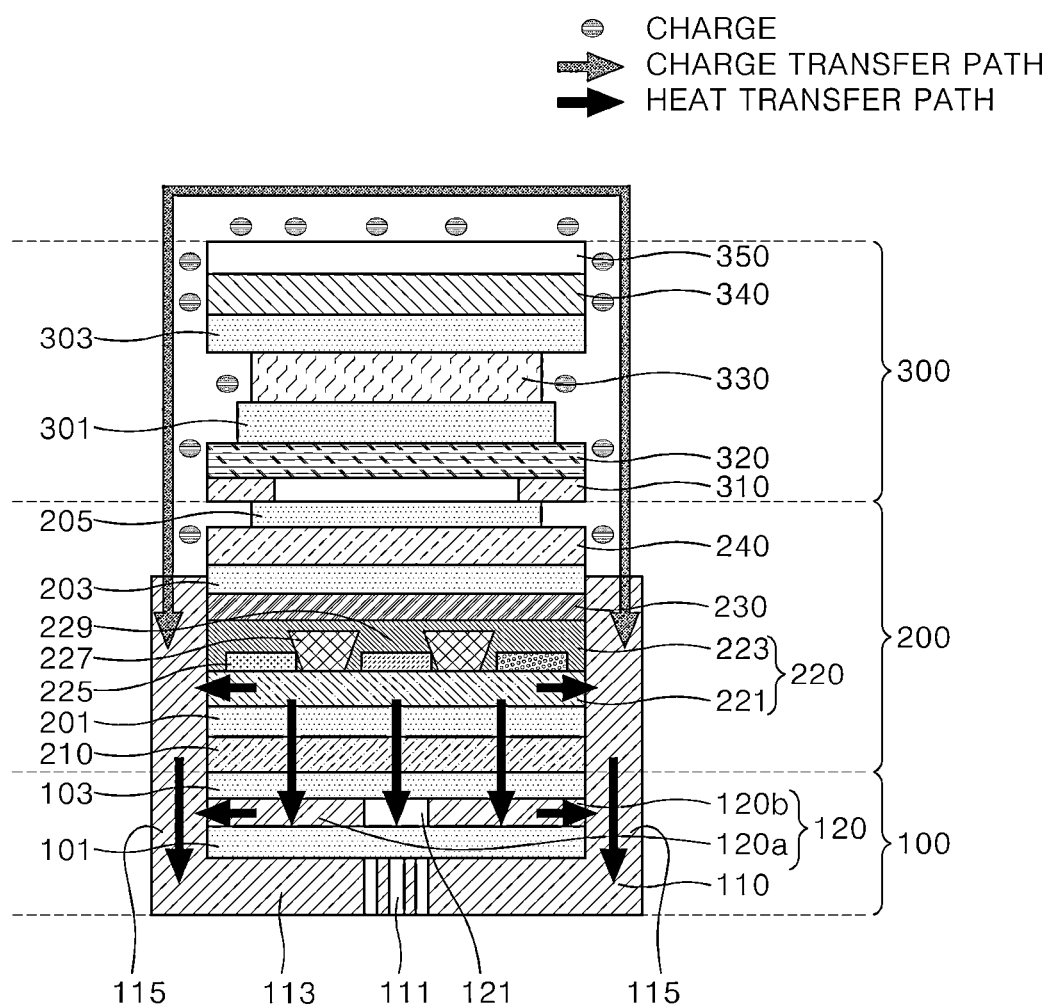

FIG. 1A and FIG. 1B are cross-sectional views of a foldable display apparatus according to an embodiment of the present disclosure.

Referring to FIG. 1A and FIG. 1B, a foldable display apparatus 1 may include a plate assembly 100, a display panel assembly 200, and a cover window 300.

The cover window 300 may be disposed on the display panel assembly 200. The cover window 300 may protect the display panel assembly 200 from damage due to an external impact and a scratch.

The plate assembly 100 may be disposed beneath the display panel assembly 200. The plate assembly 100 may protect the display panel assembly 200 from external moisture, heat, impact, and the like and may dissipate heat generated from the display panel assembly 200 to the outside.

The display panel assembly 200 may include a support layer 210, a display panel 220, a touch panel 230, and a polarizing layer 240.

The support layer 210 may be disposed on a back face of the display panel 220, and may protect the display panel 220 from the external moisture, heat, impact, and the like.

The support layer 210 may be a back plate for supporting the back face of the display panel 220. The support layer 210 may be formed using a polyethylene terephthalate (PET) film or a metal thin-film, but the present disclosure may not be limited thereto.

The display panel 220 may be disposed on the support layer 210.

The display panel 220 may create an image to be realized. A type of the display panel 220 may not be limited, but the display panel 220 may be an organic light-emitting display panel, a micro light-emitting diode display panel, and the like, which are advantageous for implementing a flexible display apparatus.

The display panel 220 may include an array 221 and a pixel portion 223 including a plurality of pixels.

The array 221 may include an array substrate, a plurality of signal lines for supplying various signals to the plurality of pixels, a plurality of switching thin-film transistor, a plurality of driving thin-film transistor, and the like.

The signal lines may include a gate line, a data line, a pixel driving power line, and the like.

The pixel portion 223 may include a plurality of pixel areas defined by the signal lines.

A plurality of pixels for displaying the image in response to a signal supplied by the signal lines may be disposed in each pixel area.

Each of the plurality of pixels may include an anode electrode electrically connected to the driving thin-film transistor, a light-emitting element layer 225 formed on the anode electrode, and a cathode electrode electrically connected to the light-emitting element layer 225 in the pixel area.

The light-emitting element layer 225 may include, for example, an organic light-emitting element formed on the anode electrode.

The organic light-emitting element may be implemented to emit light of the same color, such as white light, for the pixels, or to emit light of different colors, such as red, green, or blue light, for the pixels. As another example, the organic light-emitting element may be composed of a first element layer that emits the red, green, and blue light for the pixels and a second element layer that is disposed on the first element layer and emits the red, green, and blue light. A charge generating layer may be disposed between the first element layer and the second element layer. The charge generating layer may include an N-type charge generating layer and a P-type charge generating layer.

As another example, the light-emitting element layer 225 may include a micro light-emitting diode element electrically connected to each of the anode electrode and the cathode electrode.

The micro light-emitting diode element, which is a light-emitting diode implemented in a form of an integrated circuit (IC) or a chip, may include a first terminal electrically connected to the anode electrode and a second terminal electrically connected to the cathode electrode.

A bank layer 227 is disposed at a boundary between two adjacent light-emitting element layers 225 to reduce color mixing of the light-emitting element layers 225 exhibiting different colors.

An encapsulation layer 229 may be disposed on the light-emitting element layer 225 and the bank layer 227. The encapsulation layer 229 may prevent moisture or foreign substances from penetrating into the light-emitting element layer 225. The encapsulation layer 229 may function as a planarization layer.

The touch panel 230 may be disposed on the display panel 220.

The touch panel 230 may have a touch sensor on encapsulation (ToE) structure in which a touch electrode and a touch line are positioned on the encapsulation layer 229 of the display panel 220, but the present disclosure may not be limited thereto.

The touch panel 230 may sense a touch input of a user, such as whether a screen is touched, touch coordinates, or the like, and may sense an input signal by a touch of the user or a tool through the cover window 300.

The touch panel 230 may be implemented in various schemes such as a resistive film scheme, a capacitive scheme, an optical scheme, or an electromagnetic scheme, and the present disclosure may not be particularly limited thereto.

The touch panel 230 may include a touch sensor structure including a plurality of touch electrodes, a plurality of touch routing wires for connecting the touch electrodes to a touch sensing circuit, and the like.

The polarizing layer 240 may be disposed on the touch panel 230.

The display panel 220 may contain various metal materials used for the thin-film transistor, the signal line, the electrode, the light-emitting element layer, and the like.

External light incident on the display panel 220 may be reflected by the metal material as described above, and visibility of the foldable display apparatus 1 may be degraded due to the reflection of the external light.

Therefore, the polarizing layer 240, including a retardation film, may selectively transmit the light to reduce the reflection of the external light incident on the display panel 220, so that outdoor visibility of the foldable display apparatus 1 may be improved.

The cover window 300 may be disposed on the display panel assembly 200.

The cover window 300 may include a patterned layer 310, a protective layer 320, a cover window 330, a back face film 340, and a hard coating layer 350.

The protective layer 320 may be disposed on the polarizing layer 240.

The protective layer 320 may be a layer on which a pattern that may be shown to the user is formed even when the display panel 220 does not display the image. The protective layer 320 may be a decorative layer, and may not be limited by terms.

The patterned layer 310 may be disposed along an edge of the protective layer 320.

For example, the patterned layer 310 may be disposed on a back face of the protective layer 320 to correspond to a bezel area of the display panel 220.

The patterned layer 310, which is a layer on which decoration is substantially printed, may be a decoration layer.

The patterned layer 310 may be made of various materials such as organic and inorganic materials, and the present disclosure may not be particularly limited thereto.

For example, the organic material may be black ink or carbon black. The inorganic material may be a material such as a silicon oxide film ($SiO_2$), a silicon nitride film ($SiN_x$), a metal, and the like.

For example, the patterned layer 310 may be formed as a color layer having a black color.

In this case, even when the display panel 220 does not display the image, the bezel area of the display panel 220 may be expressed in substantially the same color as a display area of the display panel 220, so that the screen of the display panel 220 may appear wider to the user.

For example, the patterned layer 310 may be formed using a black matrix. The black matrix may be applied as an organic layer of a resin material. For example, a colored organic resin such as an acryl, epoxy, or polyimide resin containing one of the carbon black or a black pigment may be applied.

The cover window 330 may be disposed on the protective layer 320 and the patterned layer 310.

The cover window 330 may protect the protective layer 320, the polarizing layer 240, the touch panel 230, the display panel 220, and the like below the cover window 330 from the external impact, moisture, heat, and the like.

Therefore, a glass or plastic film having an impact resistance and a light transmittance may be used to implement the cover window 330.

When the glass is used for the cover window 330, in order to prevent scattering of fragments that may occur when the cover window 330 is broken by an external force or a stress, a protective film containing polyethylene terephthalate (PET) may be additionally formed on one face of the cover window 330.

Further, when the plastic film is used for the cover window 330, an acrylic film, a colorless polyimide (PI) film, and the like may be used.

The hard coating layer 350 may be disposed on the cover window 330 and may protect the cover window 330 from the external impact.

The hard coating layer 350 may contain a transparent organic-inorganic composite material, and thus may effectively protect the cover window 330 and may reduce a decrease in the light transmittance.

The back face film 340 may be disposed beneath the hard coating layer 350, and the back face film 340 may support the hard coating layer 350.

The plate assembly 100 may be disposed on a back face of the display panel assembly 200.

The plate assembly 100 may be a frame having the impact resistance to protect the display panel assembly 200.

The plate assembly 100 may include a lower plate 110 and an upper plate 120.

The lower plate 110 may extend in a direction of the display panel assembly 200 to cover at least a portion of a side face of the display panel assembly 200.

The lower plate 110 may include a support portion 113 for supporting a bottom of the display panel assembly 200, and extended portions 115 respectively extending from both side faces of the support part 113 to support the side faces of the display panel assembly 200.

For example, the plate assembly 100 may be disposed beneath the display panel assembly 200. The plate assembly 100 may include the lower plate 110 that may accommodate at least a portion of the display panel assembly 200.

The lower plate 110 may include the support portion 113 for supporting the bottom of the display panel assembly 200.

Moreover, the lower plate 110 may include the extended portion 115 having a shape of a wall erected up to a vertical level to cover at least a portion of the side face of the display panel assembly 200.

For example, the plate assembly 100 may be formed up to a portion that covers a portion of the polarizing layer 240 of the display panel assembly 200.

The lower plate 110 may contain a metal material that has a high thermal conductivity and a good charge transfer characteristic.

Referring to FIG. 1A, the lower plate 110 may be connected to a side face of the display panel 220.

In the present disclosure, the connection between the lower plate 110 and the side face of the display panel 220 may mean connection for achieving heat transfer from the side face of the display panel 220 to the lower plate 110 or electrical connection for transferring the charges.

For example, the lower plate 110 may be in direct contact with and connected to the side face of the display panel 220. For example, the lower plate 110 may extend to a vertical level above the polarizing layer 240 of the display panel assembly 200.

As another example, a fixing member such as an adhesive layer may be interposed between the lower plate 110 and the side face of the display panel 220 to more firmly fix the lower plate 110 to the side face of the display panel 220.

The adhesive layer interposed between the lower plate 110 and the side face of the display panel 220 may have a small thickness or may have a conductivity to facilitate the heat transfer and the charge transfer.

Because the lower plate 110 is connected to the side face of the display panel 220, a heat transfer path through which the heat may be dissipated may be defined in a direction of the side face of the display panel 220.

The heat transfer path through which the heat of the display panel 220 is dissipated to the outside may be described with reference to FIG. 1B.

Referring to FIG. 1B, the heat of the display panel 220 may be transferred to the lower plate 110 through the side face of the display panel 220 to be dissipated to the outside.

When the lower plate 110 is not connected to the side face of the display panel 220, most of the heat generated from the display panel 220 may be transferred in a direction upwardly or downwardly of the display panel 220.

When the heat is transferred in the direction upwardly of the display panel 220, because the heat may be transferred to a surface of the foldable display apparatus 1 that may be in contact with the user, a convenience of use of the user may be degraded.

When the heat is transferred in the direction downwardly of the display panel 220, because a plurality of different functional layers may be additionally disposed between the display panel 220 and the lower plate 110, it may be difficult for the heat to be transferred to the lower plate 110.

Therefore, when the lower plate 110 extends in the direction of the display panel assembly 200 to cover at least the portion of the side face of the display panel assembly 200 and the lower plate 110 is connected to the side face of the display panel 220 as in an embodiment of the present disclosure, because most of the heat generated from the display panel 220 is transferred to the lower plate 110 through the side face of the display panel 220, it is possible to improve the performance of dissipating the heat of the display panel 220.

Because the lower plate 110 has the relatively great thickness to support the bottom of the display panel 220 and contains the metal material with the high thermal conductivity, most of the heat generated from the display panel 220 may be transferred to the lower plate 110.

Further, because the charges generated on the surface of the foldable display apparatus 1 may be discharged to the outside through the side face of the display panel 220 and the lower plate 110 where a charge transfer path is defined, it is possible to reduce inflow of the charges to the side face of the display panel 220.

Referring to FIG. 1B, the charges (indicated by a circle) generated on the surface of the foldable display apparatus 1 may be transferred in the downward direction toward the display panel assembly 200 along a side face of the cover window 300.

Because the side face of the display panel 220 included in the display panel assembly 200 is connected to the lower plate 110, the charges transferred along the side face of the cover window 300 may be transferred to the lower plate 110 without flowing into the display panel 220.

Although the charges may be transferred to a partial area of the display panel assembly 200 where the polarizing layer 240 is disposed, the transfer to the display panel 220 may be reduced because the display panel 220 is connected to the side face of the lower plate 110.

Therefore, according to an embodiment of the present disclosure, the charges generated on the surface of the foldable display apparatus 1 may be transferred along the side face of the cover window 300, and, in an area in which the display panel assembly 200 is disposed, the charge transfer path through which the charges are transferred to the lower plate 110 may be defined.

When the charges generated on the surface of the foldable display apparatus 1 flow into the display panel 220, a longitudinal greenish problem in which a partial area of the side face of the display panel 220 turns green over time may occur.

The charges generated on the surface of the foldable display apparatus 1 may flow into the side face of the display panel 220 through the side face of the cover window 300.

Therefore, according to an embodiment of the present disclosure, when the lower plate 110 extends in the direction of the display panel assembly 200 to cover at least the portion of the side face of the display panel assembly 200 and the lower plate 110 is connected to the side face of the display panel 220, most of the charges generated on the surface of foldable display apparatus 1 may be transferred to the lower plate 110, not to the side face of the display panel 220.

As such, according to an embodiment of the present disclosure, because the inflow of the charges generated on the surface of the foldable display apparatus 1 to the side face of the display panel 220 is reduced, it is possible to reduce the occurrence of the longitudinal greenish problem in which the partial area of the side face of the display panel 220 turns green over time.

Figure 2A:
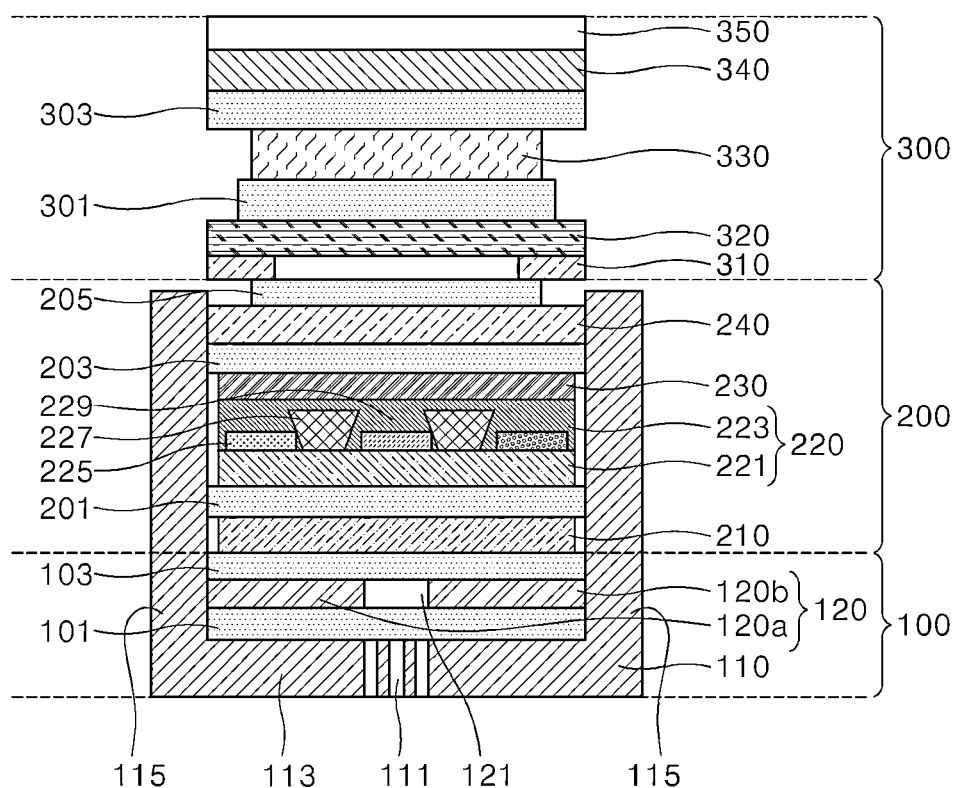
FIG. 2A and FIG. 2B are cross-sectional views of a foldable display apparatus according to another embodiment of the present disclosure.

As another embodiment of the present disclosure, referring to FIG. 2A, the lower plate 110 may be spaced apart from the side face of the display panel 220 by a predefined distance and may be connected to the polarizing layer 240 and a side face of an adhesive layer 203 beneath the polarizing layer 240 of the display panel assembly 200.

The heat generated from the display panel 220 and transferred in the upward direction may be transferred to the polarizing layer 240 disposed above the display panel 220.

Because the lower plate 110 is connected to a side face of the polarizing layer 240, the heat transfer path through which the heat may be dissipated may be defined also in a direction of the side face of the polarizing layer 240.

The heat transfer path for dissipating the heat of the display panel 220 to the outside may be described with reference to FIG. 2B.

Figure 2B:
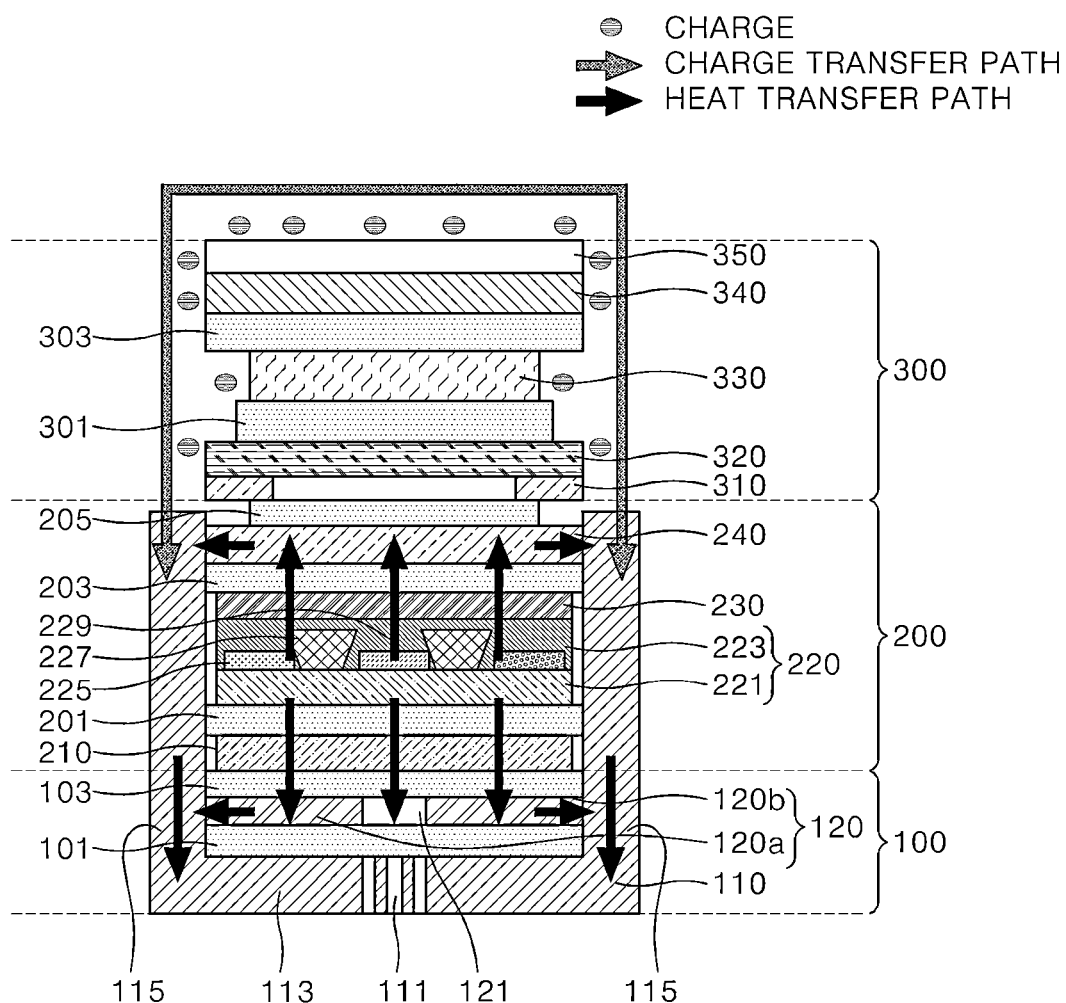

Referring to FIG. 2B, the heat generated from the display panel 220 and transferred to the polarizing layer 240 may be transferred to the lower plate 110 through the side face of the polarizing layer 240 to be dissipated to the outside.

Therefore, when the lower plate 110 extends in the direction of the display panel assembly 200 to cover at least the portion of the side face of the display panel assembly 200 and the lower plate 110 is connected to the side face of the polarizing layer 240 as in the embodiment of the present disclosure, because most of the heat generated from the display panel 220 is transferred to the lower plate 110 through the side face of the polarizing layer 240, it is possible to improve the performance of dissipating the heat of the display panel 220.

Further, because the charges generated on the surface of the foldable display apparatus 1 according to an embodiment of the present disclosure may be dissipated to the outside through the side face of the polarizing layer 240 and the lower plate 110 where the charge transfer path is defined, it is possible to reduce the inflow of the charges to the side face of the display panel 220.

Referring to FIG. 2B, the charges (indicated by a circle) generated on the surface of the foldable display apparatus 1 may be transferred in the downward direction toward the display panel assembly 200 along the side face of the cover window 300.

Because the side face of the polarizing layer 240 included in the display panel assembly 200 is connected to the lower plate 110, the charges transferred along the side face of the cover window 300 may be transferred to the lower plate 110 without flowing into the display panel 220.

Because the charges are transferred to the lower plate 110 through the polarizing layer 240 of the display panel assembly 200, the transfer to the display panel 220 may be reduced.

Therefore, according to an embodiment of the present disclosure, the charges generated on the surface of the foldable display apparatus 1 may be transferred along the side face of the cover window 300 and, in the area in which the display panel assembly 200 is disposed, the charge transfer path through which the charges are transferred to the lower plate 110 may be defined.

In this case, because the lower plate 110 is disposed to be spaced apart from the side face of the display panel 220 by the predefined distance, it is possible to further reduce a phenomenon in which some charges transferred through the side face of the polarizing layer 240 and the lower plate 110 are deviated and flow into the side face of the display panel 220.

As such, according to an embodiment of the present disclosure, because the phenomenon in which the charges generated on the surface of the foldable display apparatus 1 are deviated and flow into the side face of the display panel 220 is reduced, it is possible to further reduce the occurrence of the longitudinal greenish problem in which the partial area of the side face of the display panel 220 turns green over time.

Further, the polarizing layer 240 and the side face of the adhesive layer 203 disposed beneath the polarizing layer 240 may be extended in a horizontal direction to be connected to the lower plate 110, and the display panel 220 and the touch panel 230 disposed below the polarizing layer 240 may be disposed to be spaced apart from the lower plate 110 by a predefined distance.

Accordingly, the polarizing layer 240 and the adhesive layer 203 disposed beneath the polarizing layer 240 may reduce an occurrence of damage of the lower plate 110 resulted from friction between the lower plate 110 and components such as the display panel 220 or the touch panel 230.

The lower plate 110 may include a plurality of openings 111 defined by removing the lower plate 110 in a partial area where the foldable display apparatus 1 is folded.

The foldable display apparatus 1 may include a foldable area where the foldable display apparatus 1 is bendable and a non-foldable area where the foldable display apparatus 1 is not bendable.

The plurality of openings 111 may be defined in a foldable area of the lower plate 110 corresponding to the foldable area of the foldable display apparatus 1.

As the plurality of openings 111 where the partial area of the lower plate 110 is removed are defined in the foldable area, it is possible to reduce a folding stress applied to the lower plate 110, so that it is possible to reduce the damage to the lower plate 110 as much as possible.

Referring to FIG. 1A and FIG. 2A, the upper plate 120 may be disposed between the display panel assembly 200 and the lower plate 110, and the upper plate 120 may be connected to the lower plate 110.

For example, the upper plate 120 may be connected to the side face of the lower plate 110 extended in the direction of the display panel 220.

In the present disclosure, the upper plate 120 may be connected to the side face of the lower plate 110 extended in the direction of the display panel 220 to achieve heat transfer from the upper plate 120 to the lower plate 110.

For example, the upper plate 120 may be in direct contact with and connected to the side face of the lower plate 110 extended in the direction of the display panel 220.

As another example, the fixing member such as the adhesive layer may be interposed between the upper plate 120 and the side face of the lower plate 110 extended in the direction of the display panel 220 to more firmly fix the upper plate 120 to the side face of the lower plate 110 extended in the direction of the display panel 220.

When the heat generated from the display panel 220 is transferred in the downward direction, most of the heat may not be properly transferred to the lower plate 110 and may be accumulated on the upper plate 120 when the upper plate 120 and the lower plate 110 of the plate assembly 100 are not connected to each other.

According to an embodiment of the present disclosure, because the upper plate 120 is connected to the side face of the lower plate 110 extended in the direction of the display panel 220, the heat transfer path from the upper plate 120 to the lower plate 110 may be defined. Therefore, referring to FIG. 1B and FIG. 2B, the heat generated from the display panel 220 and transferred in the downward direction may be effectively transferred to the lower plate 110 and dissipated.

The upper plate 120 may contain a metal foam.

The metal foam, which is a porous metal structure containing a metal as a main component, may contain a plurality of pores therein.

Because the metal foam is made of the metal with high thermal conductivity, the metal foam itself may provide an excellent heat-dissipation function.

Further, because the metal foam is the metal structure containing the plurality of pores therein, because of an increase in thermal conductivity resulted from an increase of an overall surface area, the metal foam itself may provide the excellent heat-dissipation function.

Further, because the metal foam has the high thermal conductivity while having a relatively small thickness compared to a metal layer made of the metal, weight lightening of the metal foam is possible. Thus, when the metal foam is contained in the upper plate 120, a thickness of the foldable display apparatus 1 may be reduced and weight lightening of the foldable display apparatus 1 may be possible.

The metal foam may be formed by sintering a metal foam precursor containing metal powder.

The metal foam precursor may be a structure before performing a process, which is performed to form the metal foam, such as sintering.

For example, the metal foam precursor may be formed using a slurry containing the metal powder, a dispersant, and a binder.

The metal powder may be metal powder in which one or more of copper powder, nickel powder, iron powder, SUS powder, molybdenum powder, silver powder, platinum powder, gold powder, aluminum powder, chromium powder, indium powder, tin powder, magnesium powder, phosphorus powder, zinc powder, and manganese powder are mixed with each other, or alloy powder of one or more metals, but the present disclosure may not be limited thereto.

The dispersant may be, for example, alcohol, but the present disclosure may not be limited thereto.

The alcohol may be a monohydric alcohol having 1 to 20 carbon atoms, such as methanol, ethanol, propanol, pentanol, octanol, ethylene glycol, propylene glycol, phentanol, 2-methoxyethanol, 2-ethoxyethanol, 2-butoxyethanol, glycerol, texanol, or terpineol, a dihydric alcohol having 1 to 20 carbon atoms, such as ethylene glycol, propylene glycol, hexanediol, octanediol or pentanediol, or a polyhydric alcohol, but the present disclosure may not be limited thereto.

A type of binder may not be limited and may be determined based on the type of metal component or dispersant used in the preparation of the slurry.

For example, the binder may be an alkyl cellulose-based binder having an alkyl group having 1 to 8 carbon atoms, such as methyl cellulose or ethyl cellulose, a polyalkylene carbonate-based binder having an alkylene unit having 1 to 8 carbon atoms, such as polypropylene carbonate or polyethylene carbonate, or a polyvinyl alcohol-based binder, such as polyvinyl alcohol or polyvinyl acetate, but the present disclosure may not be limited thereto.

After preparing the slurry to contain the metal powder, the dispersant, and the binder as described above, it is possible to form the metal foam precursor by injecting the slurry into a mold having a predefined shape or by coating the slurry on a base.

The metal foam precursor thus formed may be formed into the metal foam through the sintering process.

In this case, conditions of the sintering process are not particularly limited as long as the process is performed at a temperature and for a time with which a desired amount of a solvent contained in the slurry may be removed.

Adhesive layers 101, 103, 201, 203, 205, 301, and 303 may be formed between the plate assembly 100, the display panel assembly 200, and the cover window 300 described above to fix layers to each other.

For example, each of the adhesive layers 101, 103, 201, 203, 205, 301, and 303 may be formed between each adjacent two of the lower plate 110, the upper plate 120, the support layer 210, the display panel 220, the polarizing layer 240, the protective layer 320, the cover window 330, and the back face film 340 to fix the layers to each other.

The adhesive layers 101, 103, 201, 203, 205, 301, and 303 may be made of a material having high adhesion and/or high transparency.

The adhesive layers 101, 103, 201, 203, 205, 301, and 303 in the present disclosure may include a layer having an attaching function as well as an adhesive function.

Each of the adhesive layers 101, 103, 201, 203, 205, 301, and 303 may be formed between each adjacent two of the layers, and may have viscoelastic properties, which may be used for the foldable display apparatus 1, while, at the same time, having an adhesive force such that bubbles, peeling, and the like do not occur even when the bending occurs.

The adhesive layers 101, 103, 201, 203, 205, 301, and 303 may contain an acrylic composition or a silicone-based composition. For example, the adhesive layers 101, 103, 201, 203, 205, 301, and 303 may contain an optical clear adhesive (OCA) composition or a pressure sensitive adhesive (PSA) composition.

Hereinafter, various embodiments in which the lower plate 110 and the upper plate 120 of the plate assembly 100 are connected to each other will be described.

Figure 3A:
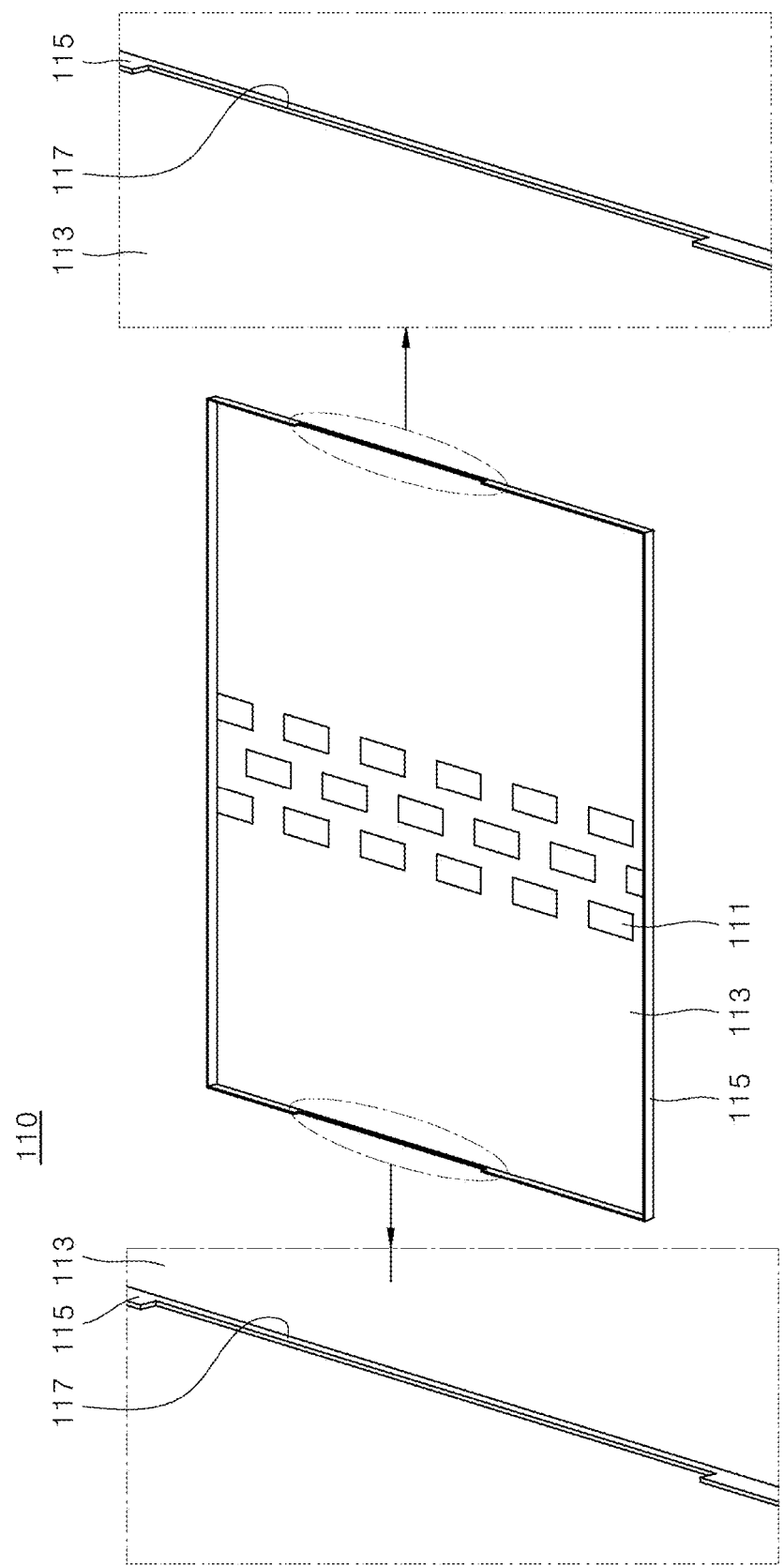
FIG. 3A and FIG. 3B are perspective views and enlarged views of a lower plate of a plate assembly according to an embodiment of the present disclosure.
Figure 3B:
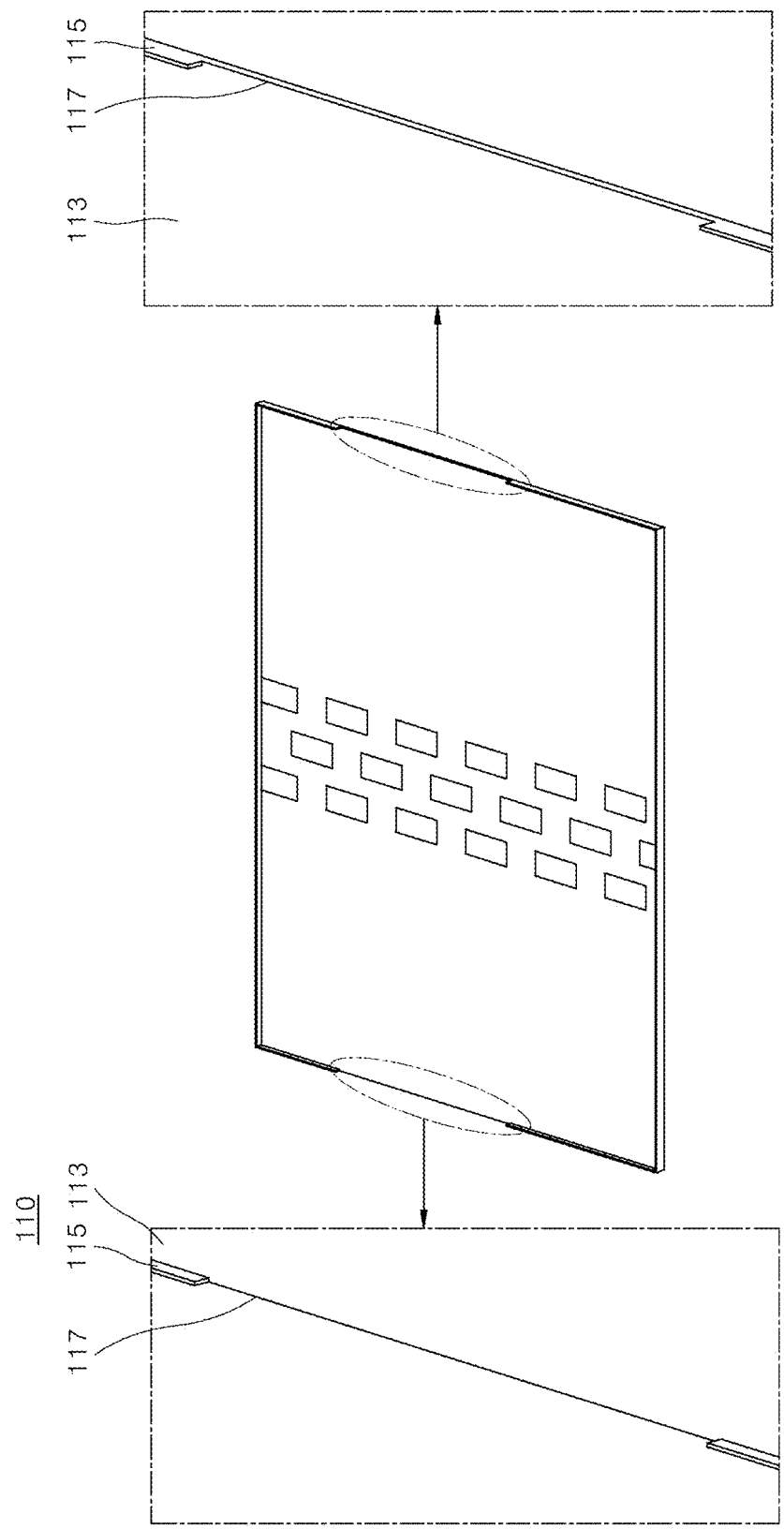

FIG. 3A and FIG. 3B are perspective views and enlarged views of the lower plate 110 of the plate assembly 100 according to an embodiment of the present disclosure.

Referring to FIG. 3A, the lower plate 110 may include the support portion 113 for supporting the display panel assembly 200.

The support portion 113 may have a shape corresponding to that of the display panel assembly 200 to support the display panel assembly 200.

For example, the support portion 113 may have a flat plate shape, but the present disclosure may not be limited thereto.

In a central area of the support portion 113 corresponding to the foldable area of the foldable display apparatus 1, there may be the plurality of openings 111 in which a partial area of the support portion 113 is removed.

Because the support portion 113 is removed in the partial area corresponding to the foldable area, when folding the foldable display apparatus 1, the foldable display apparatus 1 may be easily folded while reducing damage.

The extended portion 115 extended in the direction of the display panel assembly 200 may be formed along an edge of the support portion 113.

When the support portion 113 has the flat plate shape, the extended portions 115 may have a shape of walls extending in the direction of the display panel 220 along the edges of four sides of the support portion 113.

The extended portion 115 may be formed to extend to a vertical level at which the portion of the side face of the display panel 220 may be covered.

The lower plate 110 may include a step portion 117 where at least a partial area of the extended portion 115 on at least one side of the support portion 113 is removed.

The step portion 117 may be defined in at least one side of the support portion 113.

For example, referring to FIG. 3A, the step portion 117 may be located on each of the edges of the two sides of the support portion 113 facing each other.

The partial area of the extended portion 115 on each of the edges of the two sides of the support portion 113 facing each other may be removed to define the step portion 117.

The step portion 117 may be defined in a form in which a partial area of the extended portion 115 is removed in a longitudinal direction and a height direction of the edge on one side of the support portion 113 rather than an entire area of the extended portion 115 corresponding to the edge on one side of the support portion 113 is removed.

Accordingly, the step portion 117 may be defined to extend in the direction of the display panel assembly 200 in the same manner as the extended portion 115 although having a vertical dimension smaller than that of the extended portion 115.

As another example, the step portion 117 may be defined in a form in which, although the partial area of the extended portion 115 is removed in the longitudinal direction of the edge on one side of the support portion 113, the extended portion 115 is completely removed in the height direction of the edge on one side of the support portion 113.

Accordingly, the step portion 117 may correspond to the partial area of the edge of the support portion 113 from which the extended portion 115 is completely removed.

As another example, referring to FIG. 3B, the lower plate 110 may include the support portion 113, and the extended portions 115 disposed along the edges of the support portion 113 and extended in the direction of the display panel 220.

In an embodiment of FIG. 3B, the step portion in which the partial area of the extended portion 115 is removed may not be defined.

Accordingly, the embodiment according to FIG. 3B may have a form in which the extended portions 115 extending in the direction of the display panel 220 along all of the edges of the support portion 113 are formed.

Figure 4A:
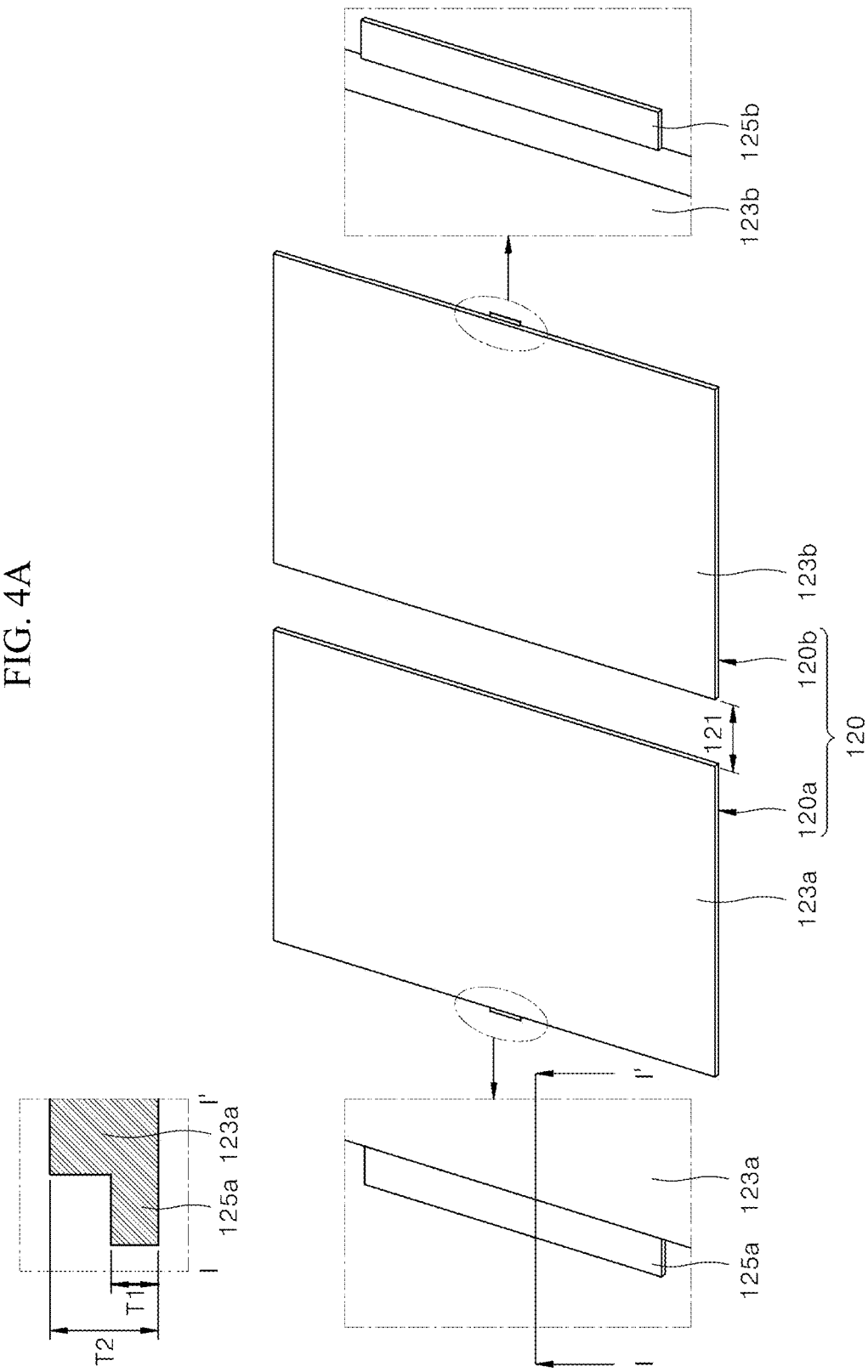
Figure 4B:
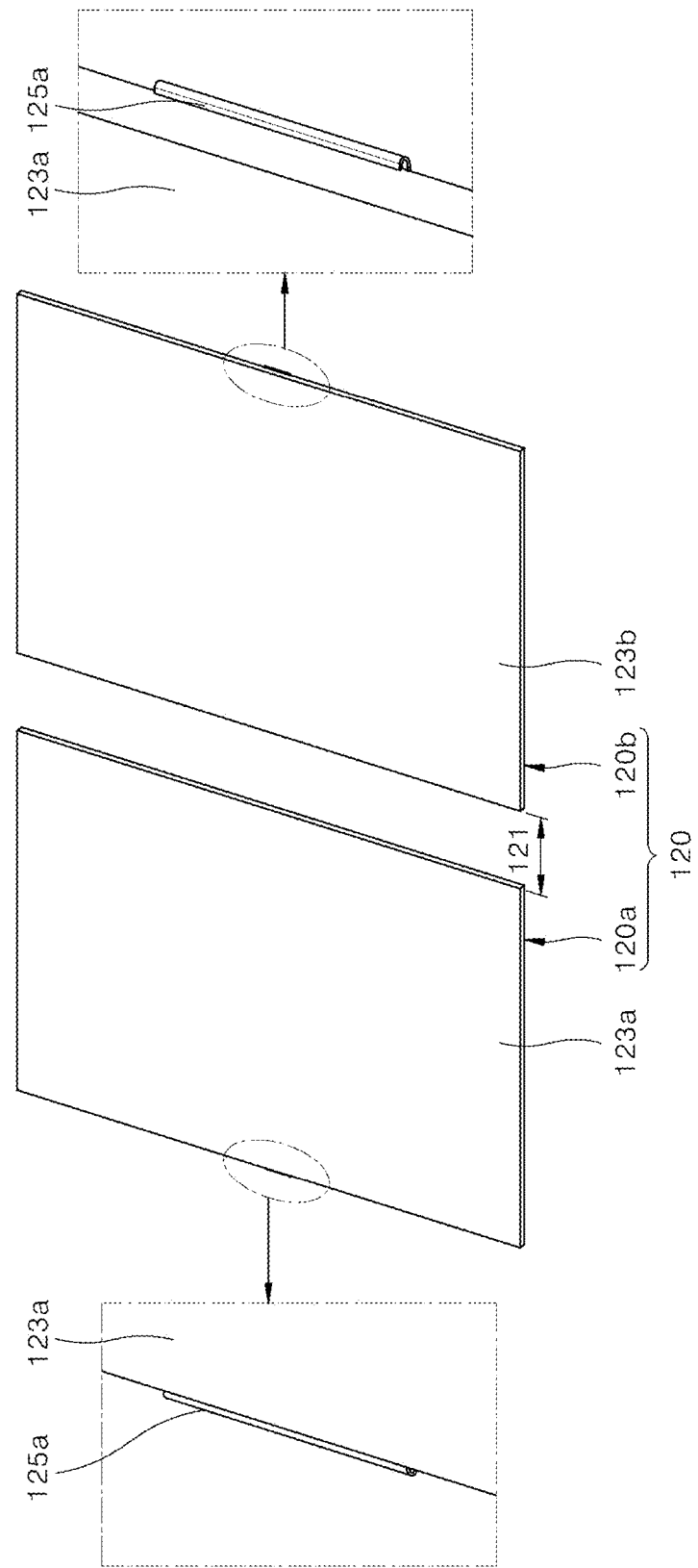

FIG. 4A to FIG. 4C are perspective views and enlarged views of the upper plate 120 of the plate assembly 100 according to various embodiments of the present disclosure.

Referring to FIG. 4A, the upper plate 120 may include a first upper plate 120a and a second upper plate 120b disposed to be spaced apart from each other with a spacing 121 defined therebetween.

Therefore, because the upper plate 120 is not disposed in an area corresponding to the spacing 121, the first upper plate 120a and the second upper plate 120b may be disposed separately from each other.

The spacing 121 of the upper plate 120 is defined to correspond to the foldable area of the foldable display apparatus 1 to facilitate the folding of the foldable display apparatus 1 and reduce the folding stress that may be applied to the upper plate 120 during the folding.

The first upper plate 120a may include a first body 123a and a first wing 125a extended in an outward direction from an edge of the first body 123a, and the second upper plate 120b may include a second body 123b and a second wing 125b extended in an outward direction from an edge of the second body 123b.

The upper plate 120 including the first upper plate 120a, the second upper plate 120b, and the spacing 121 may be formed in a shape corresponding to the shape of the lower plate 110.

For example, when the lower plate 110 is formed in the flat plate shape having four sides, the upper plate 120 may also be formed in the flat plate shape having the four sides.

Accordingly, each of the first body 123a of the first upper plate 120a and the second body 123b of the second upper plate 120b may also be formed in the flat plate shape having the four sides.

The first wing 125a may extend in the outward direction from the edge of the first body 123a, and the first wing 125a may be positioned to correspond to the step portion 117 of the lower plate 110.

The first wing 125a of the first upper plate 120a may be formed in the flat plate shape extending in the outward direction from the edge of the first body 123a and may have a length to be inserted into or accommodated in the step portion 117 of the lower plate 110.

Therefore, the length of the first wing 125a measured in a longitudinal direction of the edge of the first body 123a of the first upper plate 120a may be equal to or smaller than a length of the step portion 117 measured in a longitudinal direction of the edge of the support portion 113 of the lower plate 110.

The second wing 125b may extend in the outward direction from the edge of the second body 123b, and the second wing 125b may be positioned to correspond to the step portion 117 of the lower plate 110.

The second wing 125b of the second upper plate 120b may be formed in the flat plate shape extending in the outward direction from the edge of the second body 123b and may have a length to be inserted into the step portion 117.

Therefore, the length of the second wing 125b measured in a longitudinal direction of the edge of the second body 123b of the second upper plate 120b may be equal to or smaller than the length of the step portion 117 measured in the longitudinal direction of the edge of the support portion 113 of the lower plate 110.

Referring to FIG. 4B, the first wing 125a of the first upper plate 120a and the second wing 125b of the second upper plate 120b may be folded to be bent in a direction of back faces of the first upper plate 120a and the second upper plate 120b, respectively.

The first wing 125a may have a smaller thickness than the first body 123a so as to be easily bent and folded in the back face direction of the first upper plate 120a.

Further, the second wing 125b may have a smaller thickness than the second body 123b so as to be easily bent and folded in the back face direction of the second upper plate 120b.

As such, because the first wing 125a and the second wing 125b are respectively thinner than the first body 123a and the second body 123b, when the first wing 125a and the second wing 125b are bent and folded, radii of bending curvatures thereof may be reduced.

In another embodiment, referring to FIG. 4C, the upper plate 120 may include the first upper plate 120a and the second upper plate 120b disposed to be spaced apart from each other with the spacing 121 therebetween.

In the embodiment in FIG. 4C, the first upper plate 120a may include the first body 123a, but may not include the first wing 125a extending in the outward direction from the edge of the first body 123a.

Further, the second upper plate 120b may include the second body 123b, but may not include the second wing 125b extending in the outward direction from the edge of the second body 123b.

Hereinafter, with reference to FIGS. 5 and 6, the connection structure of the lower plate 110 and the upper plate 120 of the plate assembly 100 according to an embodiment of the present disclosure will be described in detail.

Figure 5:
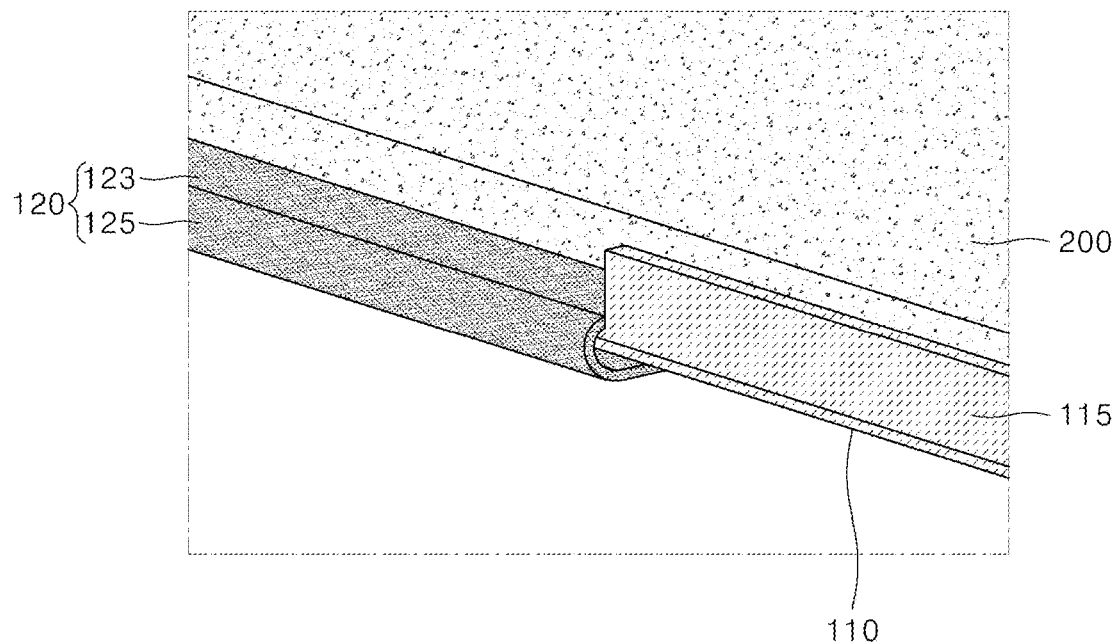
FIGS. 5 and 6 are perspective views and enlarged views of a connection structure of a lower plate and an upper plate of a plate assembly according to an embodiment of the present disclosure.

FIG. 5 relates to a connection structure of the lower plate 110 described with reference to FIG. 3A and FIG. 3B and the upper plate 120 described with reference to FIG. 4A and FIG. 4B.

Referring to FIG. 5, the first wing 125a of the first upper plate 120a may be folded to surround the step portion 117 of the lower plate 110 to be fixed to the back face of the lower plate 110.

When the first wing 125a is fixed to the back face of the lower plate 110, the first wing 125a may be fixed by the adhesive layer.

With the same scheme, the second wing 125b of the second upper plate 120b may be folded to surround the step portion 117 of the lower plate 110 to be fixed to the back face of the lower plate 110.

When the second wing 125b is fixed to the back face of the lower plate 110, the second wing 125b may be fixed by the adhesive layer.

As such, the first upper plate 120a and the second upper plate 120b may increase a contact area between the upper plate 120 and the lower plate 110 and have a strong fixing force because the first wing 125a and the second wing 125b are positioned to respectively correspond to the step portions 117 of the lower plate 110 and fixed by being folded to respectively surround the step portions 117 of the lower plate 110.

Further, when the upper plate 120 is made of the metal foam that may have the high thermal conductivity even when it is formed with the small thickness, the first wing 125a and the second wing 125b of the upper plate 120 may be easily bent.

Figure 6:
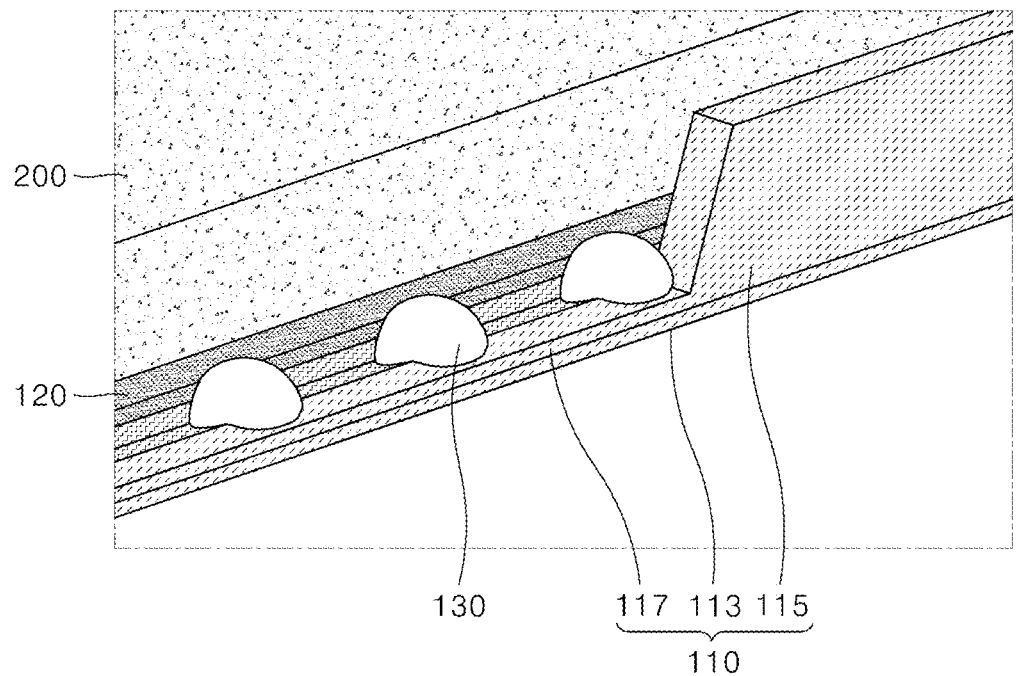

FIG. 6 relates to a connection structure of the lower plate 110 described with reference to FIG. 3A and FIG. 3B and the upper plate 120 described with reference to FIG. 4C.

The upper plate 120 may include the first upper plate 120a and the second upper plate 120b disposed to be spaced apart from each other with the spacing therebetween.

The first upper plate 120a may be connected to the lower plate 110 by a connecting member 130 located in the step portion 117 of the lower plate 110.

Because the upper plate 120 may be connected to the lower plate 110 by the separate connecting member 130, a separate additional component for the connection with the lower plate 110 such as the wing on one side face of the upper plate 120 may not be formed.

For example, the connecting member 130 may include a silver (Ag) dotting material having excellent thermal conductivity but the present disclosure may not be limited thereto.

The silver dotting material may be formed by a dotting method of dotting silver paste using a dispenser, thereby increasing an efficiency of the process.

By forming the connecting member 130 with the silver dotting material, it is possible to facilitate the connection of the upper plate 120 and the lower plate 110 without being affected by an assembly tolerance between the upper plate 120 and the lower plate 110.

Referring to FIG. 6, a plurality of silver dotting material may be disposed on the step portion 117 of the lower plate 110 to be connected to the side face of the upper plate 120.

When connecting the upper plate 120 and the lower plate 110 to each other with the connecting member 130, a process efficiency may be improved with only an additional placement of the connecting member 130 without separately processing the shape of the upper plate 120.

Figure 7A:
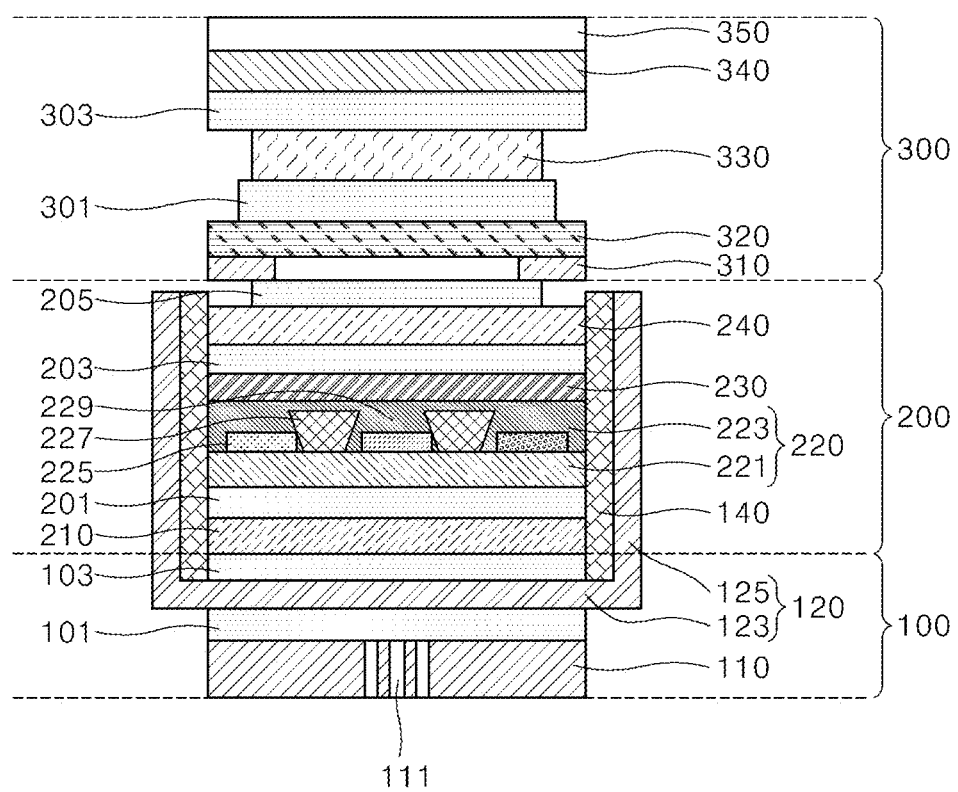
FIG. 7A and FIG. 7B are cross-sectional views of a foldable display apparatus according to another embodiment of the present disclosure.
Figure 7B:
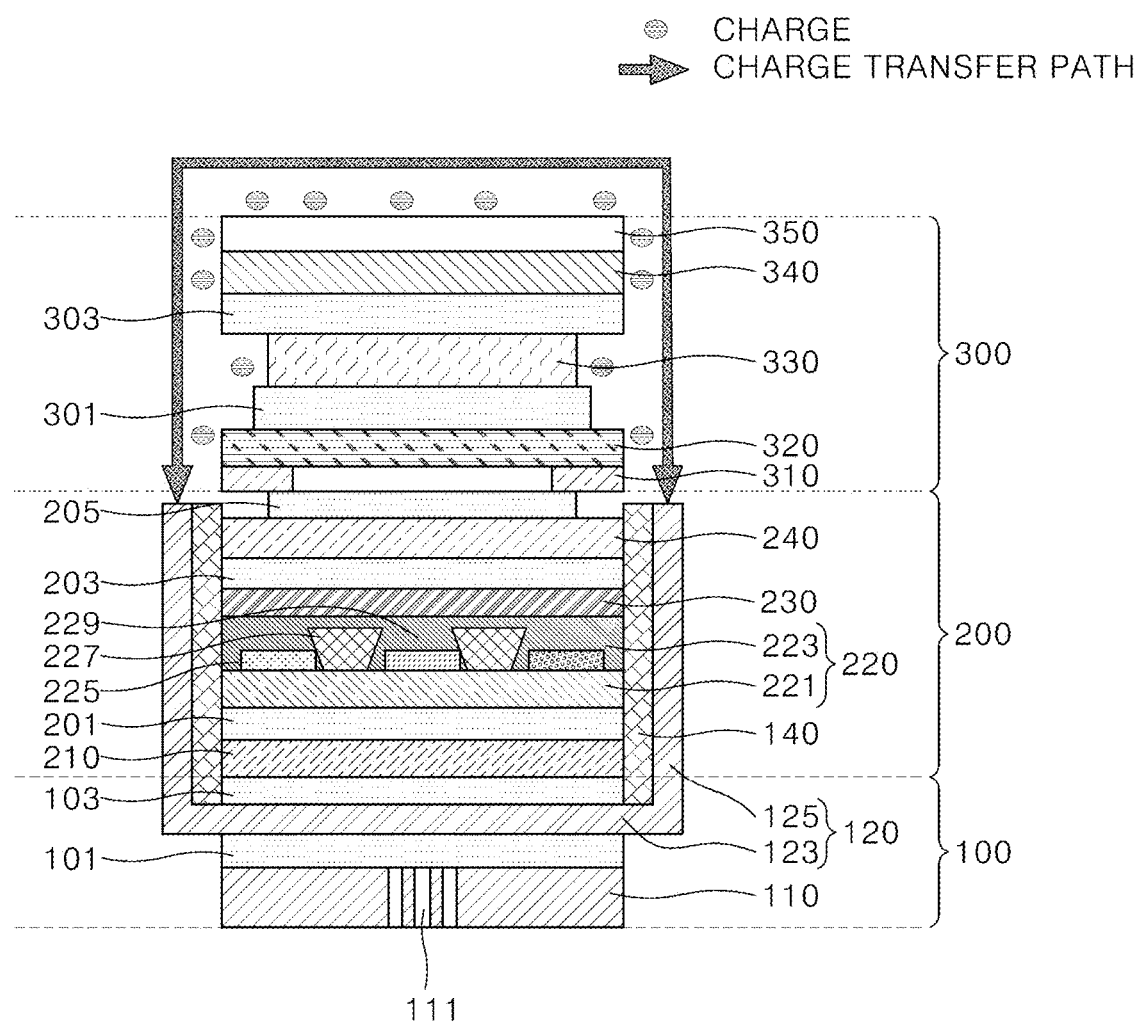

FIG. 7A and FIG. 7B are cross-sectional views of a foldable display apparatus according to another embodiment of the present disclosure.

Hereinafter, an embodiment of the foldable display apparatus described with reference to FIG. 7A and FIG. 7B will be described focusing on differences from the embodiment of the foldable display apparatus described with reference to FIG. 1A and FIG. 1B above.

Referring to FIG. 7A, the plate assembly 100 may be disposed on the back face of the display panel assembly 200.

The plate assembly 100 may include the lower plate 110 and the upper plate 120.

The lower plate 110 may support the lowermost portion of the plate assembly 100.

The upper plate 120 may be disposed on the lower plate 110.

There may be the adhesive layer 101 between the upper plate 120 and the lower plate 110.

The upper plate 120 may extend in the direction of the display panel assembly 200 to cover at least the portion of the side face of the display panel assembly 200.

The upper plate 120 may include a bottom face support portion 123 for supporting the lower portion of the display panel assembly 200, and side face support portions 125 respectively extending from both side faces of the bottom face support portion 123 to support the side faces of the display panel assembly 200.

Accordingly, the upper plate 120 may have a shape capable of accommodating or receiving at least a portion of the display panel assembly 200.

The side face support portion 125 of the upper plate 120 may have a shape of a wall erected to a vertical level to cover at least the portion of the side face of the display panel assembly 200.

For example, the side face support portion 125 of the upper plate 120 may be formed up to a portion to cover at least a portion of the polarizing layer 240 of the display panel assembly 200.

The upper plate 120 may contain the metal material with the high thermal conductivity and the good charge transfer characteristic.

A non-conductive portion 140 may be disposed between the side face support portion 125 of the upper plate 120 and the side face of the display panel assembly 200.

The non-conductive portion 140 may contain a thermosetting resin or an ultraviolet (UV) curing resin.

For example, the non-conductive portion 140 may contain an epoxy resin or a polyurethane resin, but the present disclosure may not be limited thereto.

As such, the non-conductive portion 140 is disposed between the side face support portion 125 of the upper plate 120 and the display panel assembly 220, so that the side face support portion 125 of the upper plate 120 may not directly contact the display panel assembly 220.

Referring to FIG. 7B, the charges (indicated by a circle) generated on the surface of the foldable display apparatus 1 may be transferred in the downward direction toward the display panel assembly 200 along the side face of the cover window 300.

Because the side face of the display panel assembly 200 is in contact with the non-conductive portion 140 containing the non-conductive material, the charges transferred along the side face of the cover window 300 may not flow into the display panel 220 of the display panel assembly 200 and may be transferred to the side face support portion 125 of the upper plate 120 having the conductivity. For example, because the charges transferred along the side face of the display panel 220 do not flow into the display panel 220 through the side face of the display panel 220 by the non-conductive portion 140, it is possible to reduce the occurrence of the longitudinal greenish problem of the display panel 220 due to the charges.

Therefore, according to an embodiment of the present disclosure, the charges generated on the surface of the foldable display apparatus 1 may be transferred along the side face of the cover window 300, and, in the area in which the display panel assembly 200 is disposed, a charge transfer path through which the charges are transferred to the side face support portion 125 of the upper plate 120 may be defined.

When the charges generated on the surface of the foldable display apparatus 1 flow into the display panel 220, the longitudinal greenish problem in which the partial area of the side face of the display panel 220 turns green over time may occur.

The charges generated on the surface of the foldable display apparatus 1 may flow into the side face of the display panel 220 through the side face of the cover window 300.

Thus, according to an embodiment of the present disclosure, because the inflow of the charges generated on the surface of the foldable display apparatus 1 to the side face of the display panel 220 is reduced, it is possible to reduce the occurrence of the longitudinal greenish problem in which the partial area of the side face of the display panel 220 turns green over time.

The foldable display apparatus according to an embodiment of the present disclosure may be described as follows.

A foldable display apparatus according to an embodiment of the present disclosure includes a display panel assembly, and a plate assembly disposed beneath the display panel assembly and including an upper plate and a lower plate. The lower plate extends in a direction of the display panel assembly to cover at least a portion of each side face of the display panel assembly, and the upper plate is disposed between the display panel assembly and the lower plate and is connected to the lower plate.

According to some embodiments of the present disclosure, the display panel assembly may include a display panel, and the lower plate may be connected to each side face of the display panel.

According to some embodiments of the present disclosure, the display panel assembly may include a display panel and a polarizing layer disposed on the display panel. The lower plate is disposed to be spaced apart from each side face of the display panel, and is connected to each side face of the polarizing layer.

According to some embodiments of the present disclosure, the lower plate may include a support portion, an extended portion disposed along edges of the support portion and extending in the direction of the display panel assembly, and a step portion defined by removing at least a partial area of the extended portion on each of one or more sides of the support portion.

According to some embodiments of the present disclosure, the step portion may extend in the direction of the display panel assembly and may have a smaller dimension in the direction of the display panel compared with the extended portion.

According to some embodiments of the present disclosure, a central area of the support portion may have a plurality of openings defined therein.

According to some embodiments of the present disclosure, the upper plate may include a first upper plate and a second upper plate spaced apart from each other with a spacing therebetween. The first upper plate may include a first body and a first wing extending in an outward direction from an edge of the first body, and the second upper plate may include a second body and a second wing extending in the outward direction from an edge of the second body.

According to some embodiments of the present disclosure, the first wing may have a thickness smaller than a thickness of the first body, and the second wing may have a thickness smaller than a thickness of the second body.

According to some embodiments of the present disclosure, the first wing and the second wing may be positioned to correspond to the step portions, respectively.

According to some embodiments of the present disclosure, the first wing and the second wing may be folded to surround the step portions, respectively.

According to some embodiments of the present disclosure, each of the first wing and the second wing may be fixed to the lower plate by an adhesive layer.

According to some embodiments of the present disclosure, the upper plate may include a first upper plate and a second upper plate spaced apart from each other with a spacing therebetween, and each of the first upper plate and the second upper plate may be connected to the lower plate by a connecting member located at the step portion of the lower plate.

According to some embodiments of the present disclosure, the connecting member may include a silver (Ag) dotting material.

According to some embodiments of the present disclosure, the upper plate may contain a metal foam.

A foldable display apparatus according to an embodiment of the present disclosure includes a display panel assembly including a foldable area and a non-foldable area, and a plate assembly disposed beneath the display panel assembly to accommodate at least a portion of the display panel assembly. The plate assembly includes a lower plate extending in a direction of the display panel so as to be connected to at least a portion of each side face of the display panel assembly, and an upper plate connected to the extended lower plate.

A foldable display apparatus according to another embodiment of the present disclosure includes a display panel assembly and a plate assembly disposed beneath the display panel assembly and including a lower plate and an upper plate disposed on the lower plate. The upper plate comprises a bottom face support portion which supports a lower portion of the display panel assembly, and a side face support portion which extends from side faces of the bottom face support portion toward the display panel assembly to cover at least a portion of each side face of the display panel assembly. The foldable display apparatus further includes a non-conductive portion disposed between the side face support portion of the upper plate and the side face of the display panel assembly.

It will be apparent to those skilled in the art that various modifications and variations can be made in the foldable display apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. A foldable display apparatus comprising:
    a display panel assembly; and
    a plate assembly disposed beneath the display panel assembly and including an upper plate and a lower plate,
    wherein the lower plate includes:
        a support portion supporting a bottom of the display panel assembly; and an extended portion disposed along edges of the support portion and extending in an upward direction toward the display panel assembly, wherein the extended portion of the lower plate extends in the upward direction from the lower plate toward the display panel assembly to cover and directly contact side faces of the display panel assembly, wherein the upper plate is disposed between the display panel assembly and the lower plate and is directly connected to the lower plate, wherein the upper plate is surrounded by and directly contacts a side face of the extended portion, wherein the support portion and the extended portion are integrally formed, and wherein a heat transfer path is defined for heat provided to the upper plate from the display panel, and further transferred from the upper plate and transferred to the lower plate.

2. The foldable display apparatus of claim 1, wherein the display panel assembly includes a display panel, wherein the lower plate is connected to each side face of the display panel.

3. The foldable display apparatus of claim 1, wherein the display panel assembly includes a display panel and a polarizing layer disposed on the display panel, wherein the lower plate is disposed to be spaced apart from each side face of the display panel, and is connected to each side face of the polarizing layer.

4. The foldable display apparatus of claim 1, wherein the lower plate includes:

a support portion;

an extended portion disposed along edges of the support portion and extending in the direction of the display panel assembly; and a step portion defined by removing at least a partial area of the extended portion on each of one or more sides of the support portion.

5. The foldable display apparatus of claim 4, wherein the step portion extends in the direction of the display panel assembly and has a smaller dimension in the direction of the display panel compared with the extended portion.

6. The foldable display apparatus of claim 4, wherein a central area of the support portion has a plurality of openings defined therein.

7. The foldable display apparatus of claim 4, wherein the upper plate includes a first upper plate and a second upper plate spaced apart from each other with a spacing therebetween, wherein the first upper plate includes a first body and a first wing extending in an outward direction from an edge of the first body, wherein the second upper plate includes a second body and a second wing extending in the outward direction from an edge of the second body.

8. The foldable display apparatus of claim 7, wherein the first wing has a thickness smaller than a thickness of the first body, wherein the second wing has a thickness smaller than a thickness of the second body.

9. The foldable display apparatus of claim 7, wherein the first wing and the second wing are positioned to correspond to the step portions, respectively.

10. The foldable display apparatus of claim 7, wherein the first wing and the second wing are folded to surround the step portions, respectively.

11. The foldable display apparatus of claim 10, wherein each of the first wing and the second wing is fixed to the lower plate by an adhesive layer.

12. The foldable display apparatus of claim 4, wherein the upper plate includes a first upper plate and a second upper plate spaced apart from each other with a spacing therebetween, wherein each of the first upper plate and the second upper plate is connected to the lower plate by a connecting member located at the step portion of the lower plate.

13. The foldable display apparatus of claim 12, wherein the connecting member includes a silver (Ag) dotting material.

14. The foldable display apparatus of claim 1, wherein the upper plate contains a thermally conductive metal foam.

15. The foldable display apparatus of claim 1, further comprising a cover window disposed on the display panel assembly, wherein the extended portion is spaced apart from the cover window.

16. The foldable display apparatus of claim 15, wherein the extended portion does not contact the cover window.

17. The foldable display apparatus of claim 15, wherein the extended portion protrudes outward beyond a side face of the cover window.

18. A foldable display apparatus comprising:

a display panel assembly including a foldable area and a non-foldable area; and a plate assembly disposed beneath the display panel assembly to accommodate at least a portion of the display panel assembly, wherein the plate assembly includes:

a lower plate extending in an upward direction toward the display panel and directly connected to side faces of the display panel assembly; and an upper plate directly connected to the lower plate, wherein the lower plate includes:

a support portion supporting a bottom of the display panel assembly; and an extended portion disposed along edges of the support portion and extending in the upward direction toward the display panel assembly, wherein the upper plate is surrounded by and directly contacts a side face of the extended portion, wherein the support portion and the extended portion are integrally formed, and wherein a heat transfer path is defined for heat provided to the upper plate from the display panel, and further transferred from the upper plate and transferred to the lower plate.

19. The foldable display apparatus of claim 18, wherein the upper plate contains a thermally conductive metal foam.

20. The foldable display apparatus of claim 18, further comprising a cover window disposed on the display panel assembly, wherein the extended portion is spaced apart from the cover window.

21. The foldable display apparatus of claim 20, wherein the extended portion does not contact the cover window.

22. The foldable display apparatus of claim 21, wherein the extended portion protrudes outward beyond a side face of the cover window.

\* \* \* \* \*